United States Patent
Yan et al.

(10) Patent No.: US 9,893,862 B2
(45) Date of Patent: Feb. 13, 2018

(54) AGGREGATION FRAME DESIGN METHOD AND APPARATUS

(71) Applicant: HUAWEI TECHNOLOGIES CO., LTD., Shenzhen, Guangdong (CN)

(72) Inventors: Min Yan, Shenzhen (CN); Junping Zhang, Shenzhen (CN); Wei Wang, Hong Kong (HK); Qian Zhang, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/351,781

(22) Filed: Nov. 15, 2016

(65) Prior Publication Data

US 2017/0063507 A1    Mar. 2, 2017

Related U.S. Application Data

(63) Continuation of application No. PCT/CN2014/077665, filed on May 16, 2014.

(51) Int. Cl.
*H04L 5/00* (2006.01)
*H04L 27/26* (2006.01)
(Continued)

(52) U.S. Cl.
CPC .......... *H04L 5/0053* (2013.01); *H04L 5/0048* (2013.01); *H04L 27/2626* (2013.01);
(Continued)

(58) Field of Classification Search
CPC .... H04L 49/3009; H04W 8/005; H04W 8/24; Y02B 60/43
(Continued)

(56) References Cited

U.S. PATENT DOCUMENTS 6,553,029 B1 * 4/2003 Alexander ............ H04L 49/351
370/389
8,432,934 B2  4/2013 Qian
(Continued)

FOREIGN PATENT DOCUMENTS

| CN | 1691663 A | 11/2005 |
|---|---|---|
| CN | 101714896 A | 5/2010 |
| WO | 2005/107207 A1 | 11/2005 |

OTHER PUBLICATIONS

International Search Report dated Feb. 16, 2015 in corresponding International Application No. PCT/CN2014/077665.
(Continued)

*Primary Examiner* — David S Huang
(74) *Attorney, Agent, or Firm* — Staas & Halsey LLP

(57) ABSTRACT

Embodiments of the present application provide an aggregation frame design method and apparatus, the method includes: selecting, by a transmit end from N different hash function groups, one group that has a same sequence number as that of each receive end, mapping a MAC address of each receive end into a number X, and denoting the number X; obtaining M first sequences of each receive end, and performing a bitwise OR operation on the M first sequences to obtain an identification sequence of each receive end; obtaining N identification sequences of N receive ends, performing a bitwise OR operation on the N identification sequences to obtain a Bloom sequence, and encoding and modulating the Bloom sequence to map the Bloom sequence onto an OFDM symbol; and forming an aggregation frame by using a pilot signal, the OFDM symbol, the N identification sequences, and data of the N receive ends.

14 Claims, 5 Drawing Sheets

(51) Int. Cl.
  *H04L 29/12* (2006.01)
  *H04L 29/02* (2006.01)
  *H04L 29/06* (2006.01)

(52) U.S. Cl.
  CPC .......... *H04L 27/2647* (2013.01); *H04L 29/02* (2013.01); *H04L 61/6022* (2013.01); *H04L 69/22* (2013.01)

(58) Field of Classification Search
  USPC .................................................. 370/392, 474
  See application file for complete search history.

(56) References Cited

U.S. PATENT DOCUMENTS

| | | |
|---|---|---|
| 2005/0226273 A1 | 10/2005 | Qian |
| 2007/0014237 A1 | 1/2007 | Nishibayashi et al. |
| 2007/0097930 A1 | 5/2007 | Ouyang et al. |
| 2007/0226062 A1* | 9/2007 | Hughes .................. G06Q 30/02 705/14.14 |
| 2008/0049654 A1 | 2/2008 | Otal et al. |
| 2008/0279219 A1 | 11/2008 | Wu et al. |
| 2009/0232124 A1 | 9/2009 | Cordeiro et al. |

OTHER PUBLICATIONS

International Search Report dated Feb. 16, 2015 in corresponding International Patent Application No. PCT/CN2014/077665.
Extended European Search Report dated Apr. 3, 2017 in corresponding European Patent Application No. 14891724.8.
Chang F. et al.: "Approximate Caches for Packet Classification" Infocom 2004. Twenty-Third Annual Joint Conference of the IEEE Computer and Communications Socities, IEEE, Piscataway, NJ, USA, vol. 4, Mar. 7, 2004, pp. 2196-2207, XP010740589.
Wang Wei et al.: "Less Transmissions, More Throughput: Bringing Carpool to Public WLANs", IEEE Transactions on Mobile Computing, IEEE Service Center, Los Alamitos, CA US, vol. 15, No. 5, May 1, 2016, pp. 1168-1181, XP011605046.
IEEE, "Part 11: Wireless LAN Medium Access Control (MAC) and Physical Layer (PHY) Specifications" IEEE Computer Society, IEEE Std 802.11-2012.
IEEE, "Part 11: Wireless LAN Medium Access Control (MAC) and Physical Layer (PHY) Specifications; Amendment 4: Enhancements for Very High Throughput for Operation in Bands below 6 GHz" IEEE Computer Society, IEEE Std 802.11-2013.

\* cited by examiner

AGGREGATION FRAME DESIGN METHOD AND APPARATUS

CROSS-REFERENCE TO RELATED APPLICATIONS

This application is a continuation of International Application No. PCT/CN2014/077665, filed on May 16, 2014, the disclosure of which is hereby incorporated by reference in its entirety.

TECHNICAL FIELD

The present invention relates to the communications field, and in particular, to an aggregation frame design method and apparatus.

BACKGROUND

Modern communications technologies have increasingly high demand for data traffic, and it is necessary to implement data transmission with higher MAC efficiency. Generally, MAC efficiency is used to indicate efficiency of transmitting a valid load by a network system, and higher MAC efficiency indicates less system overheads.

Generally, data is transmitted in a unit of frame in a network. A frame aggregation technology can be used to improve MAC efficiency. The frame aggregation technology means that in a scenario of one receive end, a transmit end splices multiple frames corresponding to the one receive end into one aggregation frame for transmission; and in a scenario of multiple receive ends, not only data frames to be sent to different receive ends need to be aggregated into one long frame at the transmit end for transmission, but also a packet header corresponding to each receive end needs to be added to the front of a data frame that is in the long frame and that is corresponding to the receive end, so that each receive end can determine, according to the packet header in the long frame, whether data following the packet header is data required by the receive end, so as to correctly receive data.

In the foregoing solution, corresponding packet headers need to be added for all the receive ends, and it is found through analysis that overheads are high in the foregoing solution, and the overheads increase linearly with an increase of a quantity of receive ends but only a limited gain can be obtained.

SUMMARY

Embodiments of the present invention provide an aggregation frame design method and apparatus. At a transmit end, data segments to be sent to multiple receive ends are aggregated into a long frame for transmission, and one OFDM symbol is used to distinguish each receive end, thereby reducing overheads during network data transmission.

To achieve the foregoing objective, the following technical solutions are used in the embodiments of the present invention:

According to a first aspect, a transmit end is disclosed, including:

a selection unit, configured to: select, for each receive end from preset N different hash function groups, one group that has a same sequence number as that of the receive end, where each of the N different hash function groups includes M different hash functions;

a mapping unit, configured to: map a MAC address of the receive end into a number X by successively using each hash function included in the hash function group selected by the selection unit, and denote the number X by using a first sequence, to obtain M first sequences corresponding to the receive end, where X is an integer greater than or equal to 1, and the first sequence is a sequence whose $X^{th}$ bit is 1 and remaining bits are 0s;

a calculation unit, configured to: perform a bitwise OR operation on the M first sequences obtained by the mapping unit, to obtain an identification sequence corresponding to the receive end; where the calculation unit is further configured to: obtain, according to M first sequences that are corresponding to each of N receive ends and obtained by the mapping unit, N identification sequences corresponding to the N receive ends; and the calculation unit is further configured to: perform a bitwise OR operation on the N identification sequences to obtain a Bloom sequence;

an encoding unit, configured to encode and modulate the Bloom sequence to map the Bloom sequence onto an orthogonal frequency division multiplexing OFDM symbol by using a subcarrier;

an aggregation unit, configured to form an aggregation frame by using a pilot signal, the OFDM symbol, the N identification sequences, and data corresponding to the N receive ends; and a sending unit, configured to send the aggregation frame obtained by the aggregation unit to the N receive ends.

With reference to the first aspect, in a first possible implementation manner, a value range of X is greater than or equal to 1 and less than or equal to 92, and the first sequence is a sequence whose $X^{th}$ bit is 1 and remaining 91 bits are 0s.

With reference to the first aspect or the first possible implementation manner of the first aspect, in a second possible implementation manner, the aggregation unit is specifically configured to: aggregate data segments corresponding to all the receive ends, and add, to the front of a data segment corresponding to each receive end, an identification sequence of the receive end corresponding to the data segment to form a load data segment; and place the OFDM symbol before the load data segment and after the pilot signal to form the aggregation frame.

With reference to the first aspect or the first or the second possible implementation manner of the first aspect, in a third possible implementation manner, the transmit end further includes a presetting unit, where the presetting unit is configured to: before the selection unit selects, for each receive end from the preset N different hash function groups, one group that has the same sequence number as that of the receive end, sort the N receive ends to obtain a sequence number corresponding to each receive end; and design, for the N receive ends, the N different hash function groups, where each of the hash function groups includes M different hash functions, and the sequence number of each receive end is the same as a sequence number of a hash function group corresponding to the receive end.

According to a second aspect, a receive end is disclosed, including:

a selection unit, configured to: select, from N different hash function groups, one group that has a same sequence number as that of the receive end, where the N different hash function groups are preset by a transmit end for N receive ends, and each of the N different hash function groups includes M different hash functions;

a mapping unit, configured to: map a MAC address of the receive end into a number X by successively using each hash function included in the hash function group selected by the selection unit, and denote the number X by using a first sequence, to obtain M first sequences corresponding to the receive end, where X is an integer greater than or equal to 1, and the first sequence is a sequence whose $X^{th}$ bit is 1 and remaining bits are 0s; and a calculation unit, configured to: perform a bitwise OR operation on the M first sequences obtained by the mapping unit, to obtain an identification sequence corresponding to the receive end.

With reference to the second aspect, in a first possible implementation manner, a value range of X is greater than or equal to 1 and less than or equal to 92, and the first sequence is a sequence whose $X^{th}$ bit is 1 and remaining 91 bits are 0s.

With reference to the second aspect or the first possible implementation manner of the second aspect, in a second possible implementation manner, the receive end further includes a receiving unit, a decoding unit, and an identification unit, where the receiving unit is configured to receive an aggregation frame sent by the transmit end;

the decoding unit is configured to obtain an orthogonal frequency division multiplexing OFDM symbol that is in the aggregation frame and follows a pilot signal, and decode and demodulate the OFDM symbol to obtain a Bloom sequence, where the aggregation frame carries the pilot signal, the OFDM symbol, and N data segments and N identification sequences that are corresponding to the N receive ends; and the identification unit is configured to compare the Bloom sequence with the identification sequence corresponding to the receive end; and when bits that are in the Bloom sequence and corresponding to bits corresponding to all 1s in the identification sequence corresponding to the receive end are all 1s, determine that the aggregation frame carries data of the receive end, or when not all bits that are in the Bloom sequence and corresponding to bits corresponding to all 1s in the identification sequence corresponding to the receive end are 1s, determine that the aggregation frame does not carry data required by the receive end.

According to a third aspect, an aggregation frame design method is disclosed and applied to a transmit end in a network data transmission system, and includes:

selecting, by the transmit end for each receive end from preset N different hash function groups, one group that has a same sequence number as that of the receive end, mapping a MAC address of the receive end into a number X by successively using each hash function included in the selected hash function group, and denoting the number X by using a first sequence, where each of the N different hash function groups includes M different hash functions, X is an integer greater than or equal to 1, and the first sequence is a sequence whose $X^{th}$ bit is 1 and remaining bits are 0s;

obtaining, by the transmit end, M first sequences corresponding to the receive end, and performing a bitwise OR operation on the M first sequences to obtain an identification sequence corresponding to the receive end;

obtaining, by the transmit end, N identification sequences corresponding to N receive ends, performing a bitwise OR operation on the N identification sequences to obtain a Bloom sequence, and encoding and modulating the Bloom sequence to map the Bloom sequence onto an orthogonal frequency division multiplexing OFDM symbol by using a subcarrier; and forming, by the transmit end, an aggregation frame by using a pilot signal, the OFDM symbol, the N identification sequences, and data corresponding to the N receive ends, and sending the aggregation frame to the N receive ends.

With reference to the third aspect, in a first possible implementation manner, a value range of X is greater than or equal to 1 and less than or equal to 92, and the first sequence is a sequence whose $X^{th}$ bit is 1 and remaining 91 bits are 0s.

With reference to the third aspect or the first possible implementation manner of the third aspect, in a second possible implementation manner, the forming, by the transmit end, an aggregation frame by using a pilot signal, the Bloom sequence, the N identification sequences, and data corresponding to the N receive ends is specifically:

aggregating, by the transmit end, data segments corresponding to all the receive ends, and adding, to the front of a data segment corresponding to each receive end, an identification sequence of the receive end corresponding to the data segment to form a load data segment; and placing, by the transmit end, the Bloom sequence before the load data segment and after the pilot signal to form the aggregation frame.

With reference to the third aspect or the first or the second possible implementation manner of the third aspect, in a third possible implementation manner, before the selecting, by the transmit end for each receive end from preset N different hash function groups, one group that has a same sequence number as that of the receive end, the method further includes:

sorting, by the transmit end, the N receive ends to obtain a sequence number corresponding to each receive end; and designing, by the transmit end for the N receive ends, the N different hash function groups, where each of the hash function groups includes M different hash functions, and the sequence number of each receive end is the same as a sequence number of a hash function group corresponding to the receive end.

According to a fourth aspect, an aggregation frame design method is disclosed and applied to a receive end in a network data transmission system, and includes:

selecting, by the receive end from N different hash function groups, one group that has a same sequence number as that of the receive end, mapping a MAC address of the receive end into a number X by successively using each hash function included in the selected hash function group, and denoting the number X by using a first sequence, where the N different hash function groups are preset by a transmit end for N receive ends, each of the N different hash function groups includes M different hash functions, X is an integer greater than or equal to 1, and the first sequence is a sequence whose $X^{th}$ bit is 1 and remaining bits are 0s; and obtaining, by the receive end, M first sequences corresponding to the receive end, and performing a bitwise OR operation on the M first sequences to obtain an identification sequence corresponding to the receive end.

With reference to the fourth aspect, in a first possible implementation manner, a value range of X is greater than or equal to 1 and less than or equal to 92, and the first sequence is a sequence whose $X^{th}$ bit is 1 and remaining 91 bits are 0s.

With reference to the fourth aspect or the first possible implementation manner of the fourth aspect, in a second possible implementation manner, the method further includes:

receiving, by the receive end, an aggregation frame sent by the transmit end, obtaining an orthogonal frequency division multiplexing OFDM symbol that is in the aggregation frame and follows a pilot signal, and decoding and demodulating the OFDM symbol to obtain a Bloom sequence, where the aggregation frame carries the pilot signal, the OFDM symbol, and N data segments and N identification sequences that are corresponding to the N receive ends; and comparing, by the receive end, the Bloom sequence with the identification sequence corresponding to the receive end, where if bits that are in the Bloom sequence and corresponding to bits corresponding to all 1s in the identification sequence corresponding to the receive end are 1s, the aggregation frame carries data required by the receive end; otherwise, the aggregation frame does not carry data required by the receive end.

According to the aggregation frame design method and apparatus that are provided in the embodiments of the present invention, all receive ends are sorted; one group is selected from preset function groups according to a sequence number of each receive end; and a sequence uniquely corresponding to each receive end is obtained by using the selected function group. Then, a bitwise OR operation is performed on the sequences corresponding to all the receive ends to obtain a Bloom sequence; and after being encoded and modulated, the Bloom sequence is mapped onto an OFDM symbol and added to an aggregation frame, so as to distinguish among each receive end. Therefore, a prior-art problem that overheads are excessively high because packet headers corresponding to all receive ends need to be added to an aggregation frame to distinguish each receive end is avoided; one OFDM symbol can be used to distinguish each receive end, thereby significantly reducing the overheads.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
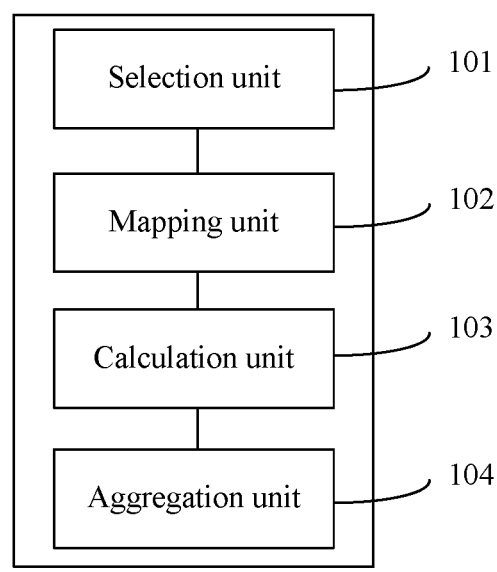
FIG. 1 is a structural block diagram of a transmit end according to Embodiment 1 of the present invention.

This embodiment of the present invention provides a transmit end. As shown in FIG. 1, the transmit end includes: a selection unit 101, a mapping unit 102, a calculation unit 103, an encoding unit 104, an aggregation unit 105, and a sending unit 106.

The selection unit 101 is configured to: select, for each receive end from preset N different hash function groups, one group that has a same sequence number as that of the receive end, where each of the N different hash function groups includes M different hash functions.

The mapping unit 102 is configured to: map a MAC address of the receive end into a number X by successively using each hash function included in the hash function group selected by the selection unit 101, and denote the number X by using a first sequence, to obtain M first sequences corresponding to the receive end, where X is an integer greater than or equal to 1, and the first sequence is a sequence whose $X^{th}$ bit is 1 and remaining bits are 0s. For example, a value range of X may be defined as being greater than or equal to 1 and less than or equal to 92, that is, the first sequence is a sequence whose $X^{th}$ bit is 1 and remaining 91 bits are 0s.

The calculation unit 103 is configured to: perform a bitwise OR operation on the M first sequences obtained by the mapping unit 102, to obtain an identification sequence corresponding to the receive end.

The calculation unit 103 is further configured to: obtain, according to M first sequences that are corresponding to each of N receive ends and obtained by the mapping unit 102, N identification sequences corresponding to the N receive ends.

The calculation unit 103 is further configured to: perform a bitwise OR operation on the N identification sequences to obtain a Bloom sequence.

The encoding unit 104 is configured to encode and modulate the Bloom sequence to map the Bloom sequence onto an orthogonal frequency division multiplexing OFDM symbol by using a subcarrier.

The aggregation unit 105 is configured to form an aggregation frame by using a pilot signal, the OFDM symbol, the N identification sequences, and data corresponding to the N receive ends.

The sending unit 106 is configured to send the aggregation frame obtained by the aggregation unit 105 to the N receive ends.

The aggregation unit 105 is specifically configured to: aggregate data segments corresponding to all the receive ends, and add, to the front of a data segment corresponding to each receive end, an identification sequence of the receive end corresponding to the data segment to form a load data segment; and place the Bloom sequence before the load data segment and after the pilot signal to form the aggregation frame.

The transmit end further includes a presetting unit. The presetting unit is configured to: before the selection unit 101 selects, for each receive end from the preset N different hash function groups, one group that has the same sequence number as that of the receive end, sort the N receive ends to obtain a sequence number corresponding to each receive end; and design, for the N receive ends, the N different hash function groups, where each of the hash function groups includes M different hash functions, and the sequence number of each receive end is the same as a sequence number of a hash function group corresponding to the receive end.

Figure 2:
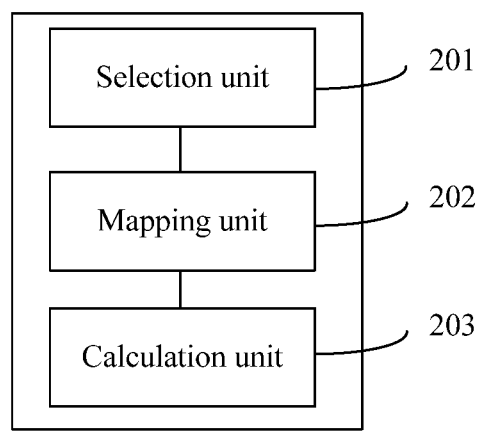
FIG. 2 is a structural block diagram of a receive end according to Embodiment 1 of the present invention.

This embodiment of the present invention provides a receive end. As shown in FIG. 2, the receive end includes: a selection unit 201, a mapping unit 202, and a calculation unit 203.

The selection unit 201 is configured to: select, from N different hash function groups, one group that has a same sequence number as that of the receive end, where the N different hash function groups are preset by a transmit end for N receive ends, and each of the N different hash function groups includes M different hash functions.

The mapping unit 202 is configured to: map a MAC address of the receive end into a number X by successively using each hash function included in the hash function group selected by the selection unit 201, and denote the number X by using a first sequence, to obtain M first sequences corresponding to the receive end, where X is an integer greater than or equal to 1, and the first sequence is a sequence whose $X^{th}$ bit is 1 and remaining bits are 0s. For example, a value range of X may be defined as being greater than or equal to 1 and less than or equal to 92, that is, the first sequence is a sequence whose $X^{th}$ bit is 1 and remaining 91 bits are 0s.

The calculation unit 203 is configured to: perform a bitwise OR operation on the M first sequences obtained by the mapping unit 202, to obtain an identification sequence corresponding to the receive end.

The receive end further includes a receiving unit, a decoding unit, and an identification unit. The receiving unit is configured to receive an aggregation frame sent by the transmit end.

The decoding unit is configured to obtain an orthogonal frequency division multiplexing OFDM symbol that is in the aggregation frame and follows a pilot signal, and decode and demodulate the OFDM symbol to obtain a Bloom sequence, where the aggregation frame carries the pilot signal, the OFDM symbol, and N data segments and N identification sequences that are corresponding to the N receive ends.

The identification unit is configured to compare the Bloom sequence with the identification sequence corresponding to the receive end; and when bits that are in the Bloom sequence and corresponding to bits corresponding to all 1s in the identification sequence corresponding to the receive end are all 1s, determine that the aggregation frame carries data of the receive end, or when not all bits that are in the Bloom sequence and corresponding to bits corresponding to all 1s in the identification sequence corresponding to the receive end are 1s, determine that the aggregation frame does not carry data required by the receive end.

According to the apparatus provided in this embodiment of the present invention, all receive ends are sorted; one group is selected from preset function groups according to a sequence number of each receive end; and a sequence uniquely corresponding to each receive end is obtained by using the selected function group. Then, a bitwise OR operation is performed on the sequences corresponding to all the receive ends to obtain a Bloom sequence; and after being encoded and modulated, the Bloom sequence is mapped onto an OFDM symbol and added to an aggregation frame, so as to distinguish each receive end. Therefore, a prior-art problem that overheads are excessively high because packet headers corresponding to all receive ends need to be added to an aggregation frame to distinguish each receive end is avoided; one OFDM symbol can be used to distinguish each receive end, thereby significantly reducing the overheads.

Embodiment 2

This embodiment of the present invention provides a transmit end. In hardware implementation, the selection unit, the mapping unit, the calculation unit, the encoding unit, and the aggregation unit that are shown in FIG. 1 may be built into a processor of the transmit end in a hardware form or a software form. The sending unit is a transmitter or a transmit interface. The processor may be a central processing unit (CPU), or may be a single-chip microcomputer.

Figure 3:
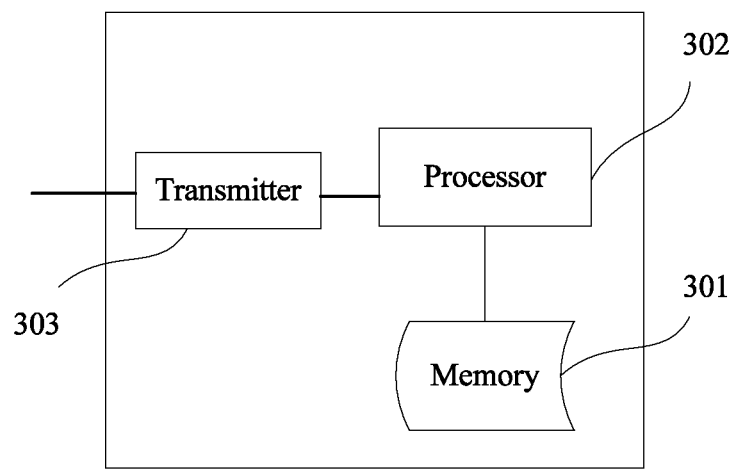
FIG. 3 is a structural block diagram of a transmit end according to Embodiment 2 of the present invention.

As shown in FIG. 3, the transmit end includes a memory 301, a processor 302 connected to the memory 301, and a transmitter 303, where the memory 301 stores a group of program code, and the processor 302 is configured to invoke the program code stored in the memory 301 to perform the following operations:

The processor 302 is configured to: select, for each receive end from preset N different hash function groups, one group that has a same sequence number as that of the receive end, where each of the N different hash function groups includes M different hash functions.

The processor 302 is configured to: map a MAC address of the receive end into a number X by successively using each hash function included in the selected hash function group, and denote the number X by using a first sequence, to obtain M first sequences corresponding to the receive end, where X is an integer greater than or equal to 1, and the first sequence is a sequence whose $X^{th}$ bit is 1 and remaining bits are 0s. For example, a value range of X may be defined as being greater than or equal to 1 and less than or equal to 92, that is, the first sequence is a sequence whose $X^{th}$ bit is 1 and remaining 91 bits are 0s.

The processor 302 is configured to: perform a bitwise OR operation on the obtained M first sequences to obtain an identification sequence corresponding to the receive end.

The processor 302 is further configured to: obtain, according to obtained M first sequences corresponding to each of N receive ends, N identification sequences corresponding to the N receive ends.

The processor 302 is further configured to perform a bitwise OR operation on the N identification sequences to obtain a Bloom sequence, and encode and modulate the Bloom sequence to map the Bloom sequence onto an orthogonal frequency division multiplexing OFDM symbol by using a subcarrier.

The processor 302 is configured to form an aggregation frame by using a pilot signal, the OFDM symbol, the N identification sequences, and data corresponding to the N receive ends.

The processor 302 is further configured to send the aggregation frame to the N receive ends by using the transmitter 303.

The processor 302 is specifically configured to: aggregate data segments corresponding to all the receive ends, and add, to the front of a data segment corresponding to each receive end, an identification sequence of the receive end corresponding to the data segment to form a load data segment; and place the OFDM symbol before the load data segment and after the pilot signal to form the aggregation frame.

The processor 302 is configured to: before selecting, for each receive end from the preset N different hash function groups, one group that has the same sequence number as that of the receive end, sort the N receive ends to obtain a sequence number corresponding to each receive end; and design, for the N receive ends, the N different hash function groups, where each of the hash function groups includes M different hash functions, and the sequence number of each receive end is the same as a sequence number of a hash function group corresponding to the receive end.

This embodiment of the present invention further provides a receive end. In hardware implementation, the selection unit, the mapping unit, and the calculation unit that are shown in FIG. 2 may be built into a processor of the receive end in a hardware form or a software form, and the receiving unit may be a receiver or a receive interface. The processor may be a central processing unit (CPU), or may be a single-chip microcomputer.

Figure 4:
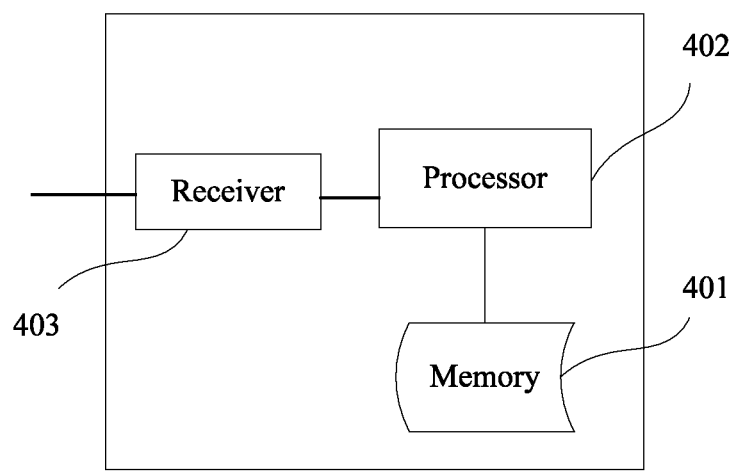
FIG. 4 is a structural block diagram of a receive end according to Embodiment 2 of the present invention.

As shown in FIG. 4, the receive end includes a memory 401, a processor 402 connected to the memory 401, and a receiver 403, where the memory 401 stores a group of program code, and the processor 402 is configured to invoke the program code stored in the memory 401 to perform the following operations:

The processor 402 is configured to: select, from N different hash function groups, one group that has a same sequence number as that of the receive end, where the N different hash function groups are preset by a transmit end for N receive ends, and each of the N different hash function groups includes M different hash functions.

The processor 402 is configured to: map a MAC address of the receive end into a number X by successively using each hash function included in the selected hash function group, and denote the number X by using a first sequence, to obtain M first sequences corresponding to the receive end, where X is an integer greater than or equal to 1, and the first sequence is a sequence whose $X^{th}$ bit is 1 and remaining bits are 0s. For example, a value range of X may be defined as being greater than or equal to 1 and less than or equal to 92, that is, the first sequence is a sequence whose $X^{th}$ bit is 1 and remaining 91 bits are 0s.

The processor 402 is configured to: perform a bitwise OR operation on the obtained M first sequences to obtain an identification sequence corresponding to the receive end.

The processor 402 is further configured to: receive, by using the receiver 403, an aggregation frame sent by the transmit end, obtain an orthogonal frequency division multiplexing OFDM symbol that is in the aggregation frame and follows a pilot signal, and decode and demodulate the OFDM symbol to obtain a Bloom sequence, where the aggregation frame carries the pilot signal, the OFDM symbol, and N data segments and N identification sequences that are corresponding to the N receive ends; and compare the Bloom sequence with the identification sequence corresponding to the receive end; and when bits that are in the Bloom sequence and corresponding to bits corresponding to all 1s in the identification sequence corresponding to the receive end are all 1s, determine that the aggregation frame carries data of the receive end, or when not all bits that are in the Bloom sequence and corresponding to bits corresponding to all 1s in the identification sequence corresponding to the receive end are 1s, determine that the aggregation frame does not carry data required by the receive end.

According to the apparatus provided in this embodiment of the present invention, all receive ends are sorted; one group is selected from preset function groups according to a sequence number of each receive end; and a sequence uniquely corresponding to each receive end is obtained by using the selected function group. Then, a bitwise OR operation is performed on the sequences corresponding to all the receive ends to obtain a Bloom sequence; and after being encoded and modulated, the Bloom sequence is mapped onto an OFDM symbol and added to an aggregation frame, so as to distinguish each receive end. Therefore, a prior-art problem that overheads are excessively high because packet headers corresponding to all receive ends need to be added to an aggregation frame to distinguish each receive end is avoided; one OFDM symbol can be used to distinguish each receive end, thereby significantly reducing the overheads.

Embodiment 3

This embodiment of the present invention further provides a data transmission system, and the data transmission system includes a transmit end, at least one receive end, and a network used for communication between the transmit end and the at least one receive end. The transmit end is the transmit end shown in FIG. 3 of the foregoing embodiment; and the receive end is the receive end shown in FIG. 4 of the foregoing embodiment. The transmit end selects, from N different hash function groups, one group that has a same sequence number as that of each receive end; and maps a MAC address of each receive end into a number X by using each hash function included in the selected hash function group, and denotes the number X by using a first sequence whose $X^{th}$ bit is 1 and remaining bits are 0s. For example, a value range of X may be defined as being greater than or equal to 1 and less than or equal to 92, that is, the first sequence is a sequence whose $X^{th}$ bit is 1 and remaining 91 bits are 0s. The transmit end obtains M first sequences of each receive end, and performs a bitwise OR operation on the M first sequences to obtain an identification sequence of each receive end; and obtains N identification sequences of N receive ends, and performs a bitwise OR operation on the N identification sequences to obtain a Bloom sequence. After encoding and modulating the Bloom sequence, the transmit end maps the Bloom sequence onto an OFDM symbol by using a subcarrier; and finally, forms an aggregation frame by using a pilot signal, the OFDM symbol, the N identification sequences, and data of the N receive ends. The receive end receives the aggregation frame sent by the transmit end, obtains the OFDM symbol, and decodes and demodulates the OFDM symbol to obtain the Bloom sequence. The receive end selects a hash function group that has a same sequence number as that of the receive end to obtain an identification sequence of the receive end, and determines, according to the identification sequence of the receive end and the obtained Bloom sequence, whether the aggregation frame includes data required by the receive end.

According to the data transmission system provided in this embodiment of the present invention, all receive ends are sorted; one group is selected from preset hash functions according to a sequence number of each receive end; and an identification sequence uniquely corresponding to each receive end is obtained by using the selected hash function group. Then, a bitwise OR operation is performed on the identification sequences corresponding to all the receive ends to obtain a Bloom sequence; and after being encoded and modulated, the Bloom sequence is mapped onto an OFDM symbol and added to an aggregation frame, so as to distinguish each receive end. Therefore, a prior-art problem that overheads are excessively high because packet headers corresponding to all receive ends need to be added to an aggregation frame to distinguish each receive end is avoided; one OFDM symbol can be used to distinguish each receive end, thereby significantly reducing the overheads.

Embodiment 4

Figure 5:
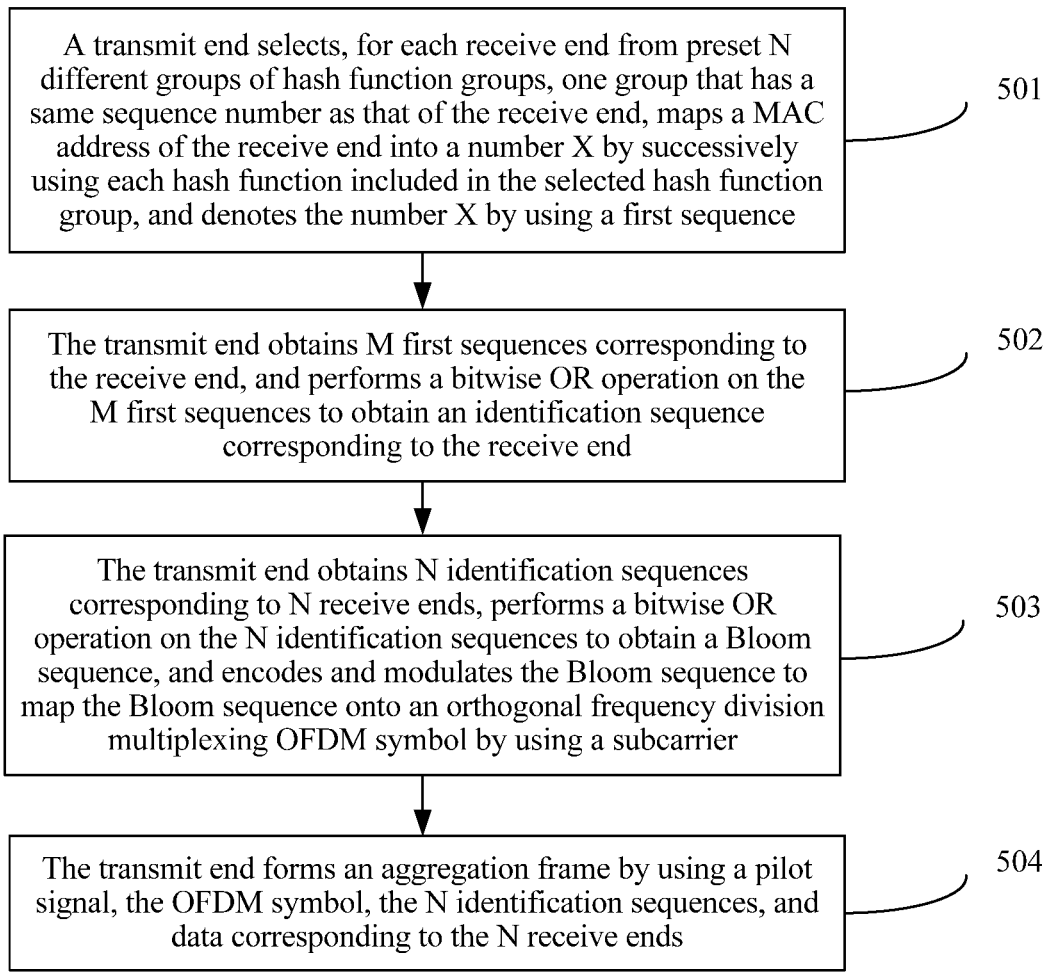
FIG. 5 is a schematic flowchart of an aggregation frame design method according to Embodiment 4 of the present invention.

This embodiment of the present invention provides an aggregation frame design method, applied to a transmit end in a network data transmission system. As shown in FIG. 5, the method includes the following steps:

501. The transmit end selects, for each receive end from preset N different hash function groups, one group that has a same sequence number as that of the receive end, maps a MAC address of the receive end into a number X by successively using each hash function included in the selected hash function group, and denotes the number X by using a first sequence.

Each of the N different hash function groups includes M different hash functions; X is an integer greater than or equal to 1; and the first sequence is a sequence whose $X^{th}$ bit is 1 and remaining bits are 0s. In addition, before step 501, the transmit end further sorts N receive ends to obtain a sequence number corresponding to each receive end; moreover, the transmit end designs, for the N receive ends, the N different hash function groups, where each of the hash function groups includes M different hash functions, and the sequence number of each receive end is the same as a sequence number of a hash function group corresponding to the receive end. In this way, a correspondence among a MAC address of each receive end, a sequence number of the receive end, and a hash function group corresponding to the receive end can be obtained. Therefore, the transmit end selects one group of hash functions according to the sequence number of each receive end, and then converts a MAC address of each receive end into a first sequence by using M different hash functions included in this group of hash functions. For example, if a value range of X is defined as being greater than or equal to 1 and less than or equal to 92, for a receive end whose sequence number is 1, a hash function group whose sequence number is 1 is selected and used as a hash function group of the receive end. If a hash function in the hash function group whose sequence number is 1 first maps a MAC address of the receive end into 32, a first sequence obtained in this way is a sequence whose $32^{nd}$ bit is 1 and remaining 91 bits are 0s.

Generally, in a general linear table (tree), a location, in the linear table (tree), of a record element corresponding to a key word is random, that is, there is no definite relationship between a key word and a record element. Therefore, searching a linear table (tree) for a record element corresponding to a key word is inefficient. An ideal situation is that a needed record element can be directly found according to the key word; therefore, it is necessary to establish a definite correspondence f between a storage location, in a linear table (tree), of each record element and a key word corresponding to the record element, so that each key word is uniquely corresponding to one storage location in the linear table (tree). The correspondence f is referred to as a hash function.

502. The transmit end obtains M first sequences corresponding to the receive end, and performs a bitwise OR operation on the M first sequences to obtain an identification sequence corresponding to the receive end.

For example, for a receive end whose sequence number is 1, a hash function group whose sequence number is 1 is selected and used as a hash function group of the receive end. If the first hash function in the hash function group whose sequence number is 1 first maps a MAC address of the receive end into 32, a first sequence obtained in this way is a sequence whose $32^{nd}$ bit is 1 and remaining bits are 0s. If the second hash function in the hash function group whose sequence number is 1 maps the MAC address of the receive end into 20, a first sequence obtained in this way is a sequence whose $20^{th}$ bit is 1 and remaining bits are 0s. By analogy, M sequences corresponding to the receive end can be obtained. Then, an identification sequence corresponding to the receive end can be obtained by performing a bitwise OR operation on the M sequences. It should be noted that the bitwise OR operation means that in binary operation, an operation result is 1 if one of two operands is 1. For example, if a bitwise OR operation is performed on a sequence 500500 and a sequence 005000, an operation result 501500 can be obtained.

503. The transmit end obtains N identification sequences corresponding to N receive ends, performs a bitwise OR operation on the N identification sequences to obtain a Bloom sequence, and encodes and modulates the Bloom sequence to map the Bloom sequence onto an orthogonal frequency division multiplexing OFDM symbol by using a subcarrier.

The transmit end can obtain the N identification sequences by successively performing steps 501 to 502 on the N receive ends corresponding to the transmit end, where each identification sequence is corresponding to one receive end. Afterward, the transmit end performs a bitwise OR operation on the N identification sequences, and finally can obtain a sequence, where the sequence is used as a Bloom sequence. Because all of the N identification sequences are 92-bit binary sequences, the Bloom sequence obtained herein is a 92-bit binary sequence. In addition, it is further necessary to encode and modulate the Bloom sequence and map a result obtained after the encoding and modulation onto an orthogonal frequency division multiplexing OFDM symbol by using a subcarrier, so as to finally distinguish each receive end by using the OFDM symbol.

504. The transmit end forms an aggregation frame by using a pilot signal, the OFDM symbol, the N identification sequences, and data corresponding to the N receive ends, and sends the aggregation frame to the N receive ends.

That the transmit end forms an aggregation frame by using a pilot signal, the OFDM symbol, the N identification sequences, and data corresponding to the N receive ends may be specifically: the transmit end aggregates data segments corresponding to all the receive ends, and adds, to the front of a data segment corresponding to each receive end, an identification sequence of the receive end corresponding to the data segment to form a load data segment; and places the OFDM symbol before the load data segment and after the pilot signal to form the aggregation frame. In addition, optionally, the transmit end may sort, according to sequence numbers of all the receive ends, data segments corresponding to all the receive ends, where a sequence number of each data segment is the same as a sequence number of the receive end corresponding to the data segment; and afterward, place the OFDM symbol before a data segment whose sequence number is 1 and after the pilot signal to form the aggregation frame. In this way, data is aggregated into a long frame at the transmit end for transmission, and the Bloom sequence is used to distinguish each receive end, thereby reducing overheads caused during network data transmission.

Figure 6:
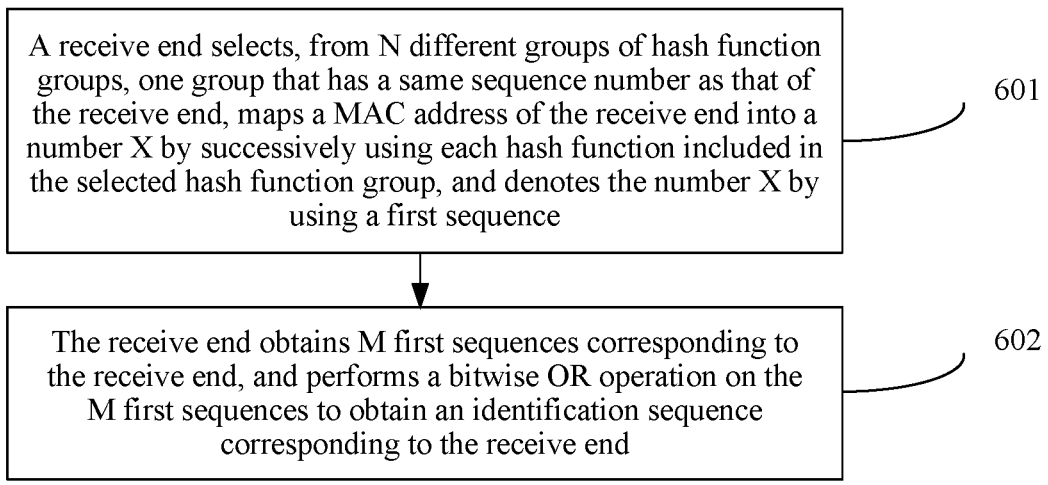
FIG. 6 is a schematic flowchart of another aggregation frame design method according to Embodiment 4 of the present invention.

This embodiment of the present invention further provides an aggregation frame design method, applied to a receive end in a network data transmission system. As shown in FIG. 6, the method includes the following steps:

601. The receive end selects, from N different hash function groups, one group that has a same sequence number as that of the receive end, maps a MAC address of the receive end into a number X by successively using each hash function included in the selected hash function group, and denotes the number X by using a first sequence.

The N different hash function groups are preset by a transmit end for N receive ends; each of the N different hash function groups includes M different hash functions; X is an integer greater than or equal to 1; and the first sequence is a sequence whose $X^{th}$ bit is 1 and remaining bits are 0s. In addition, the receive end learns a sequence number of the receive end in advance, where the sequence number is corresponding to the MAC address of the receive end, and the sequence number is obtained after the transmit end sorts the existing N receive ends. The transmit end has previously established a correspondence among a MAC address of each receive end, a sequence number of the receive end, and a hash function group corresponding to the receive end; therefore, the receive end can select one group of hash functions according to the sequence number of the receive end, and then converts the MAC address of the receive end into first sequences by using M hash functions included in this group of hash functions. For example, for a receive end whose sequence number is 5, a hash function group whose sequence number is 5 is selected and used as a hash function group of the receive end. If a hash function in the hash function group whose sequence number is 5 maps a MAC address of the receive end into 19, a first sequence obtained in this way is a sequence whose $19^{th}$ bit is 1 and remaining bits are 0s.

After the transmit end aggregates, according to the aggregation frame design method provided in this embodiment of the present invention, data of all the receive ends into a long frame and sends the long frame to each receive end, each receive end first needs to learn its sequence number, when performing decoding to identify whether the frame includes data required by the receive end, where the sequence number is obtained when the transmit end sorts all the receive ends. Only after learning its sequence number, the receive end can perform corresponding processing according to the sequence number, so as to identify whether the aggregation frame sent by the transmit end includes data required by the receive end.

602. The receive end obtains M first sequences corresponding to the receive end, and performs a bitwise OR operation on the M first sequences to obtain an identification sequence corresponding to the receive end.

Herein, to ensure that the receive end can correctly identify whether the aggregation frame sent by the transmit end includes data required by the receive end, a processing method that is the same as that of the transmit end is adopted: The receive end also needs to select, from N different groups of hash functions, one group of hash functions that has a same sequence number as that of the receive end, so as to identify, by using this group of hash functions, whether the aggregation frame sent by the transmit end carries the data required by the receive end.

The receive end performs mapping processing on the MAC address of the receive end by successively using the M corresponding hash functions, so as to obtain the M first sequences, and then performs a bitwise OR operation on the M first sequences to obtain the identification sequence corresponding to the receive end. For example, if a value range of X is defined as being greater than or equal to 1 and less than or equal to 92, a receive end whose sequence number is 5 selects a hash function group whose sequence number is 5. If the first hash function in the hash function group whose sequence number is 5 maps a MAC address of the receive end into 19, a first sequence obtained in this way is a sequence whose $19^{th}$ bit is 1 and remaining 91 bits are 0s; and if the second hash function in the hash function group whose sequence number is 5 maps the MAC address of the receive end into 78, a first sequence obtained in this way is a sequence whose $78^{th}$ bit is 1 and remaining 91 bits are 0s. By analogy, M 92-bit sequences corresponding to the receive end can be obtained. It should be noted that the bitwise OR operation means that in binary operation, an operation result is 1 if one of two operands is 1. For example, if a bitwise OR operation is performed on a sequence 100100 and a sequence 001000, an operation result 101100 can be obtained.

In addition, after receiving the aggregation frame sent by the transmit end and obtaining an orthogonal frequency division multiplexing OFDM symbol that is in the aggregation frame and follows a pilot signal, the receive end further needs to decode and demodulate the OFDM symbol to obtain a Bloom sequence. When performing identification according to the identification sequence of the receive end, the receive end compares the Bloom sequence with the identification sequence corresponding to the receive end; and when bits that are in the Bloom sequence and corresponding to bits corresponding to all 1s in the identification sequence corresponding to the receive end are all 1s, the aggregation frame carries the data required by the receive end; otherwise, the aggregation frame does not carry the data required by the receive end. Further, if a receive end determines that the aggregation frame sent by the transmit end carries data required by the receive end, the receive end can identify, in the aggregation frame, an identification sequence corresponding to the receive end, and obtain the data required by the receive end and that follows the identification sequence; and discards the aggregation frame afterward.

According to the aggregation frame design method provided in this embodiment of the present invention, all receive ends are sorted, one group is selected from preset hash functions according to a sequence number of each receive end, and an identification sequence uniquely corresponding to each receive end is obtained by using the selected hash function group. Then, a bitwise OR operation is performed on the identification sequences corresponding to all the receive ends to obtain a Bloom sequence; and after being encoded and modulated, the Bloom sequence is mapped onto an OFDM symbol and added to an aggregation frame, so as to distinguish each receive end. Therefore, a prior-art problem that overheads are excessively high because packet headers corresponding to all receive ends need to be added to an aggregation frame to distinguish each receive end is avoided; one OFDM symbol can be used to distinguish each receive end, thereby significantly reducing the overheads.

Embodiment 5

Figure 7:
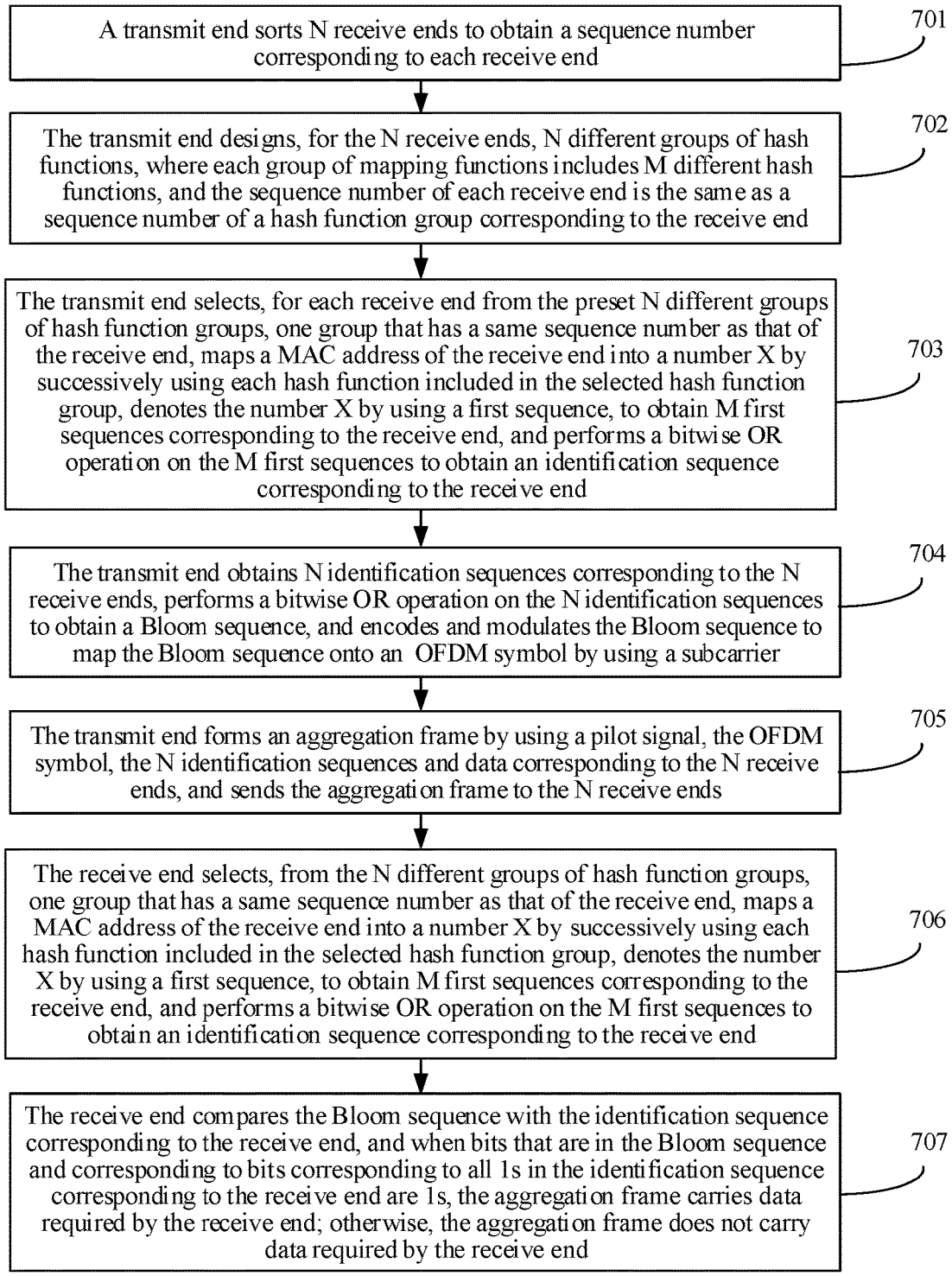
FIG. 7 is a schematic flowchart of an aggregation frame design method according to Embodiment 5 of the present invention.

This embodiment of the present invention provides an aggregation frame design method, applied to a network data transmission system. As shown in FIG. 7, the method includes the following steps:

701. A transmit end sorts N receive ends to obtain a sequence number corresponding to each receive end.

Before transmitting data to a receive end by using a network, the transmit end learns a quantity of receive ends that need to receive the data, and sorts multiple receive ends according to a specific rule, so as to obtain a sequence number corresponding to each receive end. In addition, each sequence number is also uniquely corresponding to one MAC address.

702. The transmit end designs, for the N receive ends, N different groups of hash functions, where each group of hash functions includes M different hash functions, and the sequence number of each receive end is the same as a sequence number of a hash function group corresponding to the receive end.

Generally, in a general linear table (tree), a location, in the linear table (tree), of a record element corresponding to a key word is random, that is, there is no definite relationship between a key word and a record element. Therefore, searching a linear table (tree) for a record element corresponding to a key word is inefficient. An ideal situation is that a needed record element can be directly found according to the key word; therefore, it is necessary to establish a definite correspondence f between a storage location, in a linear table (tree), of each record element and a key word corresponding to the record element, so that each key word is uniquely corresponding to one storage location in the linear table (tree). The correspondence f is referred to as a hash function.

Herein, different sequence numbers are corresponding to different hash function groups, and not all of M hash functions included in each hash function group are the same, which can ensure that identification sequences corresponding to all receive ends are different to the greatest extent.

703. The transmit end selects, for each receive end from the preset N different hash function groups, one group that has a same sequence number as that of the receive end, maps a MAC address of the receive end into a number X by successively using each hash function included in the selected hash function group, denotes the number X by using a first sequence, to obtain M first sequences corresponding to the receive end, and performs a bitwise OR operation on the M first sequences to obtain an identification sequence corresponding to the receive end.

The sequence number of the receive end is H, and each of the N different groups of hash functions includes M different hash functions; and X is an integer greater than or equal to 1, and the first sequence is a sequence whose $X^{th}$ bit is 1 and remaining bits are 0s. In addition, in steps 701 and 702, the N receive ends are sorted to obtain a sequence number corresponding to each receive end. A MAC address of each receive end is uniquely corresponding to one sequence number. The N different groups of hash functions are designed for the N receive ends, where each group of the hash functions includes M different hash functions, and the sequence number of each receive end is corresponding to one group of hash functions. In this way, a correspondence among a MAC address of each receive end, a sequence number of the receive end, and a hash function group corresponding to the receive end can be obtained. Therefore, the transmit end can obtain one corresponding group of functions according to the sequence number of each receive end, and then obtains M first sequences of each receive end successively according to M hash functions included in this group of functions. For example, if a value range of X is greater than or equal to 1 and less than or equal to 92, by successively using hash functions, the transmit end maps a MAC address of a receive end into a number X that is greater than or equal to 1 and less than or equal to 92, and then denotes the number X by using a 92-bit sequence, that is, the $X^{th}$ bit of the sequence is 1 and remaining 91 bits are 0s. In this way, M 92-bit first sequences of the receive end can be obtained. Then, an identification sequence of the receive end can be obtained by performing a bitwise OR operation on the M first sequences. It should be noted that the bitwise OR operation means that in binary operation, an operation result is 1 if one of two operands is 1. For example, if a bitwise OR operation is performed on a sequence 100100 and a sequence 001000, an operation result 101100 can be obtained.

704. The transmit end obtains N identification sequences corresponding to the N receive ends, performs a bitwise OR operation on the N identification sequences to obtain a Bloom sequence, and encodes and modulates the Bloom sequence to map the Bloom sequence onto an OFDM symbol by using a subcarrier.

The transmit end can obtain the N identification sequences by successively performing step 703 on the N receive ends. In addition, it is further necessary to perform a bitwise OR operation on the N identification sequences to obtain one sequence, and the sequence is used as a Bloom sequence. To comply with a signal transmission mode, it is further necessary to encode and modulate the Bloom sequence, and map a result of encoding and modulation onto an OFDM symbol by using a subcarrier.

705. The transmit end forms an aggregation frame by using a pilot signal, the OFDM symbol, the N identification sequences and data corresponding to the N receive ends, and sends the aggregation frame to the N receive ends.

Figure 8:
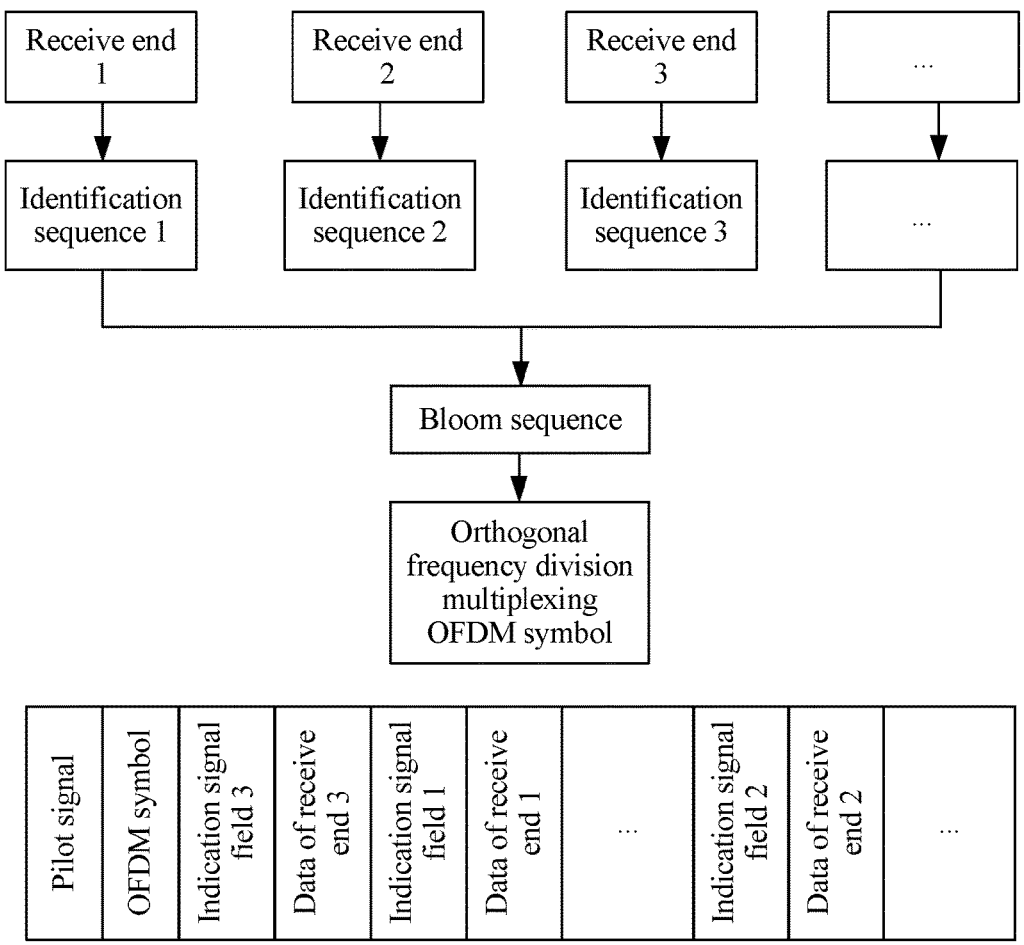
FIG. 8 is a schematic structural diagram of an aggregation frame according to Embodiment 5 of the present invention.

That the transmit end forms an aggregation frame by using a pilot signal, the OFDM symbol, and data corresponding to the N receive ends may be specifically: the transmit end aggregates data segments corresponding to all the receive ends, and adds, to the front of a data segment corresponding to each receive end, an identification sequence of the receive end corresponding to the data segment to form a load data segment; and then places the OFDM symbol before the load data segment and after the pilot signal to form the aggregation frame. An aggregation frame formed in this embodiment of the present invention is shown in FIG. 8, and according to a MAC address and a sequence number that are corresponding to each receive end, an identification sequence of each receive end and a Bloom sequence used to identify each receive end are obtained. After being encoded and modulated, the Bloom sequence is mapped onto an OFDM symbol by using a subcarrier. An aggregation frame is formed by using a pilot signal, the OFDM symbol, and data and the identification sequence of each receive end. Data corresponding to all the receive ends may be randomly sorted; provided that an identification sequence of a receive end corresponding to each data segment is added to the front of the data segment, it can be ensured that the receive end correctly obtains data after receiving the aggregation frame. As shown in FIG. 8, an identification sequence corresponding to each receive end is added to an indication signal field that is followed by a data segment corresponding to the receive end. For example, as shown in the figure, an identification sequence 2 corresponding to a receive end 2 is placed in an indication signal field 2 that is followed by a data segment of the receive end 2. Overheads are reduced, compared with the prior art in which a data packet header is added to an aggregation frame. An implementation method is further provided: The transmit end first sorts, according to sequence numbers of all the receive ends, data segments corresponding to all the receive ends, where a sequence number of each data segment is the same as a sequence number of the receive end corresponding to the data segment; and afterward, places the Bloom sequence before a data segment whose sequence number is 1 and after the pilot signal to form the aggregation frame. In this way, after determining that the aggregation frame sent by the transmit end carries data required by the receive end, the receive end can obtain the data from the aggregation frame only according to the sequence number of the receive end. For example, if a sequence number of the receive end is a, an $a^{th}$ data segment in the aggregation frame is the data required by the receive end. In this way, data is aggregated into a long frame at the transmit end for transmission, and the Bloom sequence is used to distinguish each receive end, thereby reducing overheads caused during network data transmission.

706. The receive end selects, from the N different hash function groups, one group that has a same sequence number as that of the receive end, maps a MAC address of the receive end into a number X by successively using each hash function included in the selected hash function group, denotes the number X by using a first sequence, to obtain M first sequences corresponding to the receive end, and performs a bitwise OR operation on the M first sequences to obtain an identification sequence corresponding to the receive end.

Specifically, if the sequence number of the receive end is L, a hash function group whose sequence number is L is selected from the N different hash function groups and used as the hash function group of the receive end. The N different groups of hash functions are preset by the transmit end for the N receive ends, and each of the N different groups of hash functions includes M different hash functions. In addition, the sequence number of the receive end is obtained after the transmit end sorts the existing N receive ends, and each receive end learns its sequence number after the transmit end sorts the N receive ends.

Like step 703, X is an integer greater than or equal to 1, and the first sequence is a sequence whose $X^{th}$ bit is 1 and remaining bits are 0s. For example, a value range of X may be greater than or equal to 1 and less than or equal to 92, that is, the first sequence is a sequence whose $X^{th}$ bit is 1 and remaining 91 bits are 0s. The receive end also converts, according to processing steps of the transmit end, the MAC address of the receive end into the corresponding identification sequence by using hash functions.

707. The receive end compares the Bloom sequence with the identification sequence corresponding to the receive end, where if bits that are in the Bloom sequence and corresponding to bits corresponding to all 1s in the identification sequence corresponding to the receive end are 1s, the aggregation frame carries data required by the receive end; otherwise, the aggregation frame does not carry data required by the receive end.

Each receive end first receives the aggregation frame from the transmit end, obtains the orthogonal frequency division multiplexing OFDM symbol that is in the aggregation frame and follows the pilot signal, and decodes and demodulates the OFDM symbol to obtain the Bloom sequence. Afterward, each receive end determines, according to an identification sequence of the receive end and the obtained Bloom sequence, whether the aggregation frame carries data required by the receive end. Actually, further, if bits that are in the Bloom sequence and corresponding to bits corresponding to all 1s in the identification sequence corresponding to the receive end are 1s, it is likely that the aggregation frame carries the data required by the receive end. In addition, whether some loads belong to the receive end can be determined at a MAC layer by using a MAC address; therefore, even if a load not belonging to the receive end is incorrectly determined as a load belonging to the receive end, the MAC layer can successfully filter out the load that does not belong to the receive end and is incorrectly received. If not all bits that are in the Bloom sequence and corresponding to bits corresponding to all 1s in the identification sequence corresponding to the receive end are 1s, the aggregation frame definitely carries no data required by the receive end. A receive end determines that the aggregation frame sent by the transmit end carries data required by the receive end, the receive end can identify, in the aggregation frame, an identification sequence corresponding to the receive end, and obtain the data required by the receive end and that follows the identification sequence; and discards the aggregation frame afterward.

According to the aggregation frame design method provided in this embodiment of the present invention, all receive ends are sorted; one group is selected from preset function groups according to a sequence number of each receive end; and a sequence uniquely corresponding to each receive end is obtained by using the selected function group. Then, a bitwise OR operation is performed on the sequences corresponding to all the receive ends to obtain a Bloom sequence; and after being encoded and modulated, the Bloom sequence is mapped onto an OFDM symbol and added to an aggregation frame, so as to distinguish each receive end. Therefore, a prior-art problem that overheads are excessively high because packet headers corresponding to all receive ends need to be added to an aggregation frame to distinguish each receive end is avoided; one OFDM symbol can be used to distinguish each receive end, thereby significantly reducing the overheads.

A person of ordinary skill in the art may understand that all or a part of the steps of the foregoing method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmit end, comprising:
    a transmitter;
    a memory storing a group of program code;
    a processor connected to the memory and configured to execute the program code stored in the memory to:
    select, for each receive end from preset N different hash function groups, one group that has a same sequence number as that of the receive end, wherein each of the N different hash function groups comprises M different hash functions;
    map a MAC address of the receive end into a number X by successively using each hash function comprised in the hash function group selected by the selection unit, and denote the number X by using a first sequence, to obtain M first sequences corresponding to the receive end, wherein X is an integer greater than or equal to 1, and the first sequence is a sequence whose $X^{th}$ bit is 1 and remaining bits are 0s;

perform a bitwise OR operation on the M first sequences obtained by the mapping unit, to obtain an identification sequence corresponding to the receive end, and obtain, according to M first sequences that are corresponding to each of N receive ends and obtained by the mapping unit, N identification sequences corresponding to the N receive ends, and perform a bitwise OR operation on the N identification sequences to obtain a Bloom sequence;

encode and modulate the Bloom sequence to map the Bloom sequence onto an orthogonal frequency division multiplexing OFDM symbol by using a subcarrier;

form an aggregation frame by using a pilot signal, the OFDM symbol, the N identification sequences, and data corresponding to the N receive ends; and send, via the transmitter, the aggregation frame obtained by the aggregation unit to the N receive ends;

N and M are integers greater or equal to 2.

2. The transmit end according to claim 1, wherein a value range of X is greater than or equal to 1 and less than or equal to 92, and the first sequence is a sequence whose $X^{th}$ bit is 1 and remaining 91 bits are 0s.

3. The transmit end according to claim 1, wherein the processor is further configured to: aggregate data segments corresponding to all the receive ends, and add, to the front of a data segment corresponding to each receive end, an identification sequence of the receive end corresponding to the data segment to form a load data segment; and place the OFDM symbol before the load data segment and after the pilot signal to form the aggregation frame.

4. The transmit end according to claim 1, wherein the processor is further configured to: before the processor selects, for each receive end from the preset N different hash function groups, one group that has the same sequence number as that of the receive end, sort the N receive ends to obtain a sequence number corresponding to each receive end; and design, for the N receive ends, the N different hash function groups, wherein each of the hash function groups comprises M different hash functions, and the sequence number of each receive end is the same as a sequence number of a hash function group corresponding to the receive end.

5. A receive end, comprising:

a receiver;

a memory storing a group of program code;

a processor connected to the memory and configured to execute the program code stored in the memory to:

select, from N different hash function groups, one group that has a same sequence number as that of the receive end, wherein the N different hash function groups are preset by a transmit end for N receive ends, and each of the N different hash function groups comprises M different hash functions;

map a MAC address of the receive end into a number X by successively using each hash function comprised in the hash function group selected by the selection unit, and denote the number X by using a first sequence, to obtain M first sequences corresponding to the receive end, wherein X is an integer greater than or equal to 1, and the first sequence is a sequence whose $X^{th}$ bit is 1 and remaining bits are 0s; and perform a bitwise OR operation on the M first sequences obtained by the mapping unit, to obtain an identification sequence corresponding to the receive end;

N and M are integers greater or equal to 2.

6. The receive end according to claim 5, wherein a value range of X is greater than or equal to 1 and less than or equal to 92, and the first sequence is a sequence whose $X^{th}$ bit is 1 and remaining 91 bits are 0s.

7. The receive end according to claim 5, further comprising a receiver, wherein the receiver is configured to receive an aggregation frame sent by the transmit end; and the processor is further configured to:

obtain an orthogonal frequency division multiplexing OFDM symbol that is in the aggregation frame and follows a pilot signal, and decode and demodulate the OFDM symbol to obtain a Bloom sequence, wherein the aggregation frame carries the pilot signal, the OFDM symbol, and N data segments and N identification sequences that are corresponding to the N receive ends; and compare the Bloom sequence with the identification sequence corresponding to the receive end; and when bits that are in the Bloom sequence and corresponding to bits corresponding to all 1s in the identification sequence corresponding to the receive end are all 1s, determine that the aggregation frame carries data of the receive end, or when not all bits that are in the Bloom sequence and corresponding to bits corresponding to all 1s in the identification sequence corresponding to the receive end are 1s, determine that the aggregation frame does not carry data required by the receive end.

8. An aggregation frame design method, applied to a transmit end in a network data transmission system and comprising:

selecting, by the transmit end for each receive end from preset N different hash function groups, one group that has a same sequence number as that of the receive end, mapping a MAC address of the receive end into a number X by successively using each hash function comprised in the selected hash function group, and denoting the number X by using a first sequence, wherein each of the N different hash function groups comprises M different hash functions, X is an integer greater than or equal to 1, and the first sequence is a sequence whose $X^{th}$ bit is 1 and remaining bits are 0s;

obtaining, by the transmit end, M first sequences corresponding to the receive end, and performing a bitwise OR operation on the M first sequences to obtain an identification sequence corresponding to the receive end;

obtaining, by the transmit end, N identification sequences corresponding to N receive ends, performing a bitwise OR operation on the N identification sequences to obtain a Bloom sequence, and encoding and modulating the Bloom sequence to map the Bloom sequence onto an orthogonal frequency division multiplexing OFDM symbol by using a subcarrier; and forming, by the transmit end, an aggregation frame by using a pilot signal, the OFDM symbol, the N identification sequences, and data corresponding to the N receive ends, and sending the aggregation frame to the N receive ends;

N and M are integers greater or equal to 2.

9. The method according to claim 8, wherein a value range of X is greater than or equal to 1 and less than or equal to 92, and the first sequence is a sequence whose $X^{th}$ bit is 1 and remaining 91 bits are 0s.

10. The method according to claim 8, wherein the forming, by the transmit end, an aggregation frame by using a pilot signal, the Bloom sequence, the N identification sequences, and data corresponding to the N receive ends is specifically:

aggregating, by the transmit end, data segments corresponding to all the receive ends, and adding, to the front of a data segment corresponding to each receive end, an identification sequence of the receive end corresponding to the data segment to form a load data segment; and placing, by the transmit end, the OFDM symbol before the load data segment and the pilot signal to form the aggregation frame.

11. The method according to claim 8, wherein before the selecting, by the transmit end for each receive end from preset N different hash function groups, one group that has a same sequence number as that of the receive end, the method further comprises:

sorting, by the transmit end, the N receive ends to obtain a sequence number corresponding to each receive end; and designing, by the transmit end for the N receive ends, the N different hash function groups, wherein each of the hash function groups comprises M different hash functions, and the sequence number of each receive end is the same as a sequence number of a hash function group corresponding to the receive end.

12. An aggregation frame design method, applied to a receive end in a network data transmission system and comprising:

selecting, by the receive end from N different hash function groups, one group that has a same sequence number as that of the receive end, mapping a MAC address of the receive end into a number X by successively using each hash function comprised in the selected hash function group, and denoting the number X by using a first sequence, wherein the N different hash function groups are preset by a transmit end for N receive ends, each of the N different hash function groups comprises M different hash functions, X is an integer greater than or equal to 1, and the first sequence is a sequence whose $X^{th}$ bit is 1 and remaining bits are 0s; and obtaining, by the receive end, M first sequences corresponding to the receive end, and performing a bitwise OR operation on the M first sequences to obtain an identification sequence corresponding to the receive end;

N and M are integers greater or equal to 2.

13. The method according to claim 12, wherein a value range of X is greater than or equal to 1 and less than or equal to 92, and the first sequence is a sequence whose $X^{th}$ bit is 1 and remaining 91 bits are 0s.

14. The method according to claim 12, wherein the method further comprises:

receiving, by the receive end, an aggregation frame sent by the transmit end, obtaining an orthogonal frequency division multiplexing OFDM symbol that is in the aggregation frame and follows a pilot signal, and decoding and demodulating the OFDM symbol to obtain a Bloom sequence, wherein the aggregation frame carries the pilot signal, the OFDM symbol, and N data segments and N identification sequences that are corresponding to the N receive ends; and comparing, by the receive end, the Bloom sequence with the identification sequence corresponding to the receive end, wherein if bits that are in the Bloom sequence and corresponding to bits corresponding to all 1s in the identification sequence corresponding to the receive end are 1s, the aggregation frame carries data required by the receive end; or if not all bits that are in the Bloom sequence and corresponding to bits corresponding to all 1 s in the identification sequence corresponding to the receive end are 1s, the aggregation frame does not carry data required by the receive end.

* * * * *